(12) United States Patent
Tsunoda

(10) Patent No.: US 6,738,009 B1
(45) Date of Patent: May 18, 2004

(54) SYSTEM AND METHOD FOR SYNTHETIC APERTURE RADAR MAPPING A GROUND STRIP HAVING EXTENDED RANGE SWATH

(75) Inventor: Stanley I. Tsunoda, Encinitas, CA (US)

(73) Assignee: General Atomics, San Diego, CA (US)

( * ) Notice: Subject to any disclaimer, the term of this patent is extended or adjusted under 35 U.S.C. 154(b) by 0 days.

(21) Appl. No.: 10/330,603

(22) Filed: Dec. 27, 2002

(51) Int. Cl.⁷ .......................... G01S 13/90; G01S 13/89
(52) U.S. Cl. ..................... 342/25; 342/175; 342/190; 342/191; 342/195
(58) Field of Search .................... 342/25, 26, 59, 342/175, 176, 179, 190, 191–197

(56) References Cited

U.S. PATENT DOCUMENTS

| | | | | |
|---|---|---|---|---|
| 4,321,601 A | * | 3/1982 | Richman | 342/25 |
| 4,727,373 A | * | 2/1988 | Hoover | 342/25 |
| 4,728,959 A | | 3/1988 | Maloney et al. | |
| 5,122,803 A | * | 6/1992 | Stann et al. | 342/25 |
| 5,424,742 A | * | 6/1995 | Long et al. | 342/25 |
| 5,430,445 A | * | 7/1995 | Peregrim et al. | 342/25 |
| 5,463,397 A | * | 10/1995 | Frankot | 342/25 |
| 5,583,517 A | | 12/1996 | Yokev et al. | |
| 5,596,330 A | | 1/1997 | Yokev et al. | |
| 6,150,972 A | * | 11/2000 | Bickel et al. | 342/25 |

* cited by examiner

Primary Examiner—Bernarr E. Gregory
(74) Attorney, Agent, or Firm—Nydegger & Associates (57) ABSTRACT

A system and method for mapping a ground strip having an extended range swath includes a synthetic aperture radar (SAR) mounted on a moving platform. The ground strip is divided into columns that extend from the near-range edge of the ground strip. Each column contains two or more portions and has an azimuthal length equal to the radar's near-range beamwidth, W. Each column is sequentially illuminated while the platform moves through a distance, $L_{illum}$, (equal to the near range beamwidth). During column illumination, portions within the column are sequentially mapped by altering the depression angle, $\phi$, of the radar beam. Each portion is SAR mapped using a respective SAR aperture length with the sum of aperture lengths for the column being less than or equal to the distance the platform moves during illumination. The resultant maps are mosaicked together to produce one contiguous SAR map of the ground strip.

21 Claims, 6 Drawing Sheets

SYSTEM AND METHOD FOR SYNTHETIC APERTURE RADAR MAPPING A GROUND STRIP HAVING EXTENDED RANGE SWATH

FIELD OF THE INVENTION

The present invention pertains generally to systems and methods for radar mapping. More particularly, the present invention pertains to systems and methods for radar mapping using synthetic aperture radar (SAR) in stripmap mode. The present invention is particularly, but not exclusively, useful for creating an SAR stripmap having a relatively large range swath.

BACKGROUND OF THE INVENTION

Synthetic aperture radar (SAR) is a radar system that generates the effect of a long antenna by signal processing rather than by the actual use of a long antenna. Specifically, the long antenna is synthesized through the motion of a small antenna relative to the target with either the antenna, the target or both moving. The synthesized antenna length (i.e. aperture length) is given by the trajectory traversed by the small antenna relative to the target during the time the echoes received by the antenna are processed. The relative movement between the antenna and target produces frequency shifted return echoes (i.e. Doppler shifts) that can be processed by the SAR to produce radar images having excellent cross-range resolution. The excellent cross-range resolution allows SAR to produce images that are somewhat similar in appearance to optical photographs and is the main reason why SAR has become an especially effective tool for all-weather ground mapping.

SAR is typically used in either spotlight mode when fine resolution is desired or stripmap mode when mapping of a larger area is desired. In spotlight mode, a single image is made of a fixed position on the ground using a single synthetic aperture to produce the image. On the other hand, in stripmap mode, the radar continuously images at a fixed range from a moving platform such as an aircraft. As the platform moves, a linear series of contiguous images is made corresponding to a series of synthetic apertures. Stripmap mode is often used when searching for targets of opportunity or when a map of a large area is required.

Heretofore, SAR mapping in stripmap mode has generally been accomplished by imaging with the SAR radar at a substantially constant depression angle, $\phi$. This results in a mapping of a ground strip having a range swath that is generally limited by either the elevation beamwidth of the radar beam (beam limited), or for a given resolution, the number of pixels that the radar system can accommodate (pixel limited). In greater detail, for a given resolution, range swath is generally pixel limited at small depression angles, $\phi$, and beam limited at larger depression angles, $\phi$.

During stripmap imaging at a constant depression angle, $\phi$, the section of the ground strip that is imaged during a specific aperture must be illuminated by the radar source. Additionally, to obtain a preselected resolution, a specific minimum aperture time (corresponding to a minimum distance the platform must move during imaging of the section) is required to map the section during the illumination. When a relatively coarse resolution is acceptable, the illumination time can greatly exceed the required aperture time resulting in a significant portion of the radar system's imaging capability going to waste.

In light of the above, it is an object of the present invention to provide systems and methods suitable for the purposes of SAR mapping a ground strip having a relatively large range swath. It is another object of the present invention to provide systems and methods for SAR mapping a ground strip having a relatively large range swath that can be easily implemented on existing radar systems with only minor modification to the existing radar system. Still another object of the present invention is to provide systems and methods for producing an SAR map having a uniform resolution of a ground strip having a relatively large range swath. Yet another object of the present invention is to provide systems and methods for SAR mapping a ground strip having a relatively large range swath which are easy to use, relatively simple to implement, and comparatively cost effective.

SUMMARY OF THE INVENTION

The present invention is directed to a system and method for producing a synthetic aperture radar (SAR) mapping of a ground strip from a moving platform, such as an aircraft. As detailed further below, the present invention allows the mapping of a coverage area that is not necessarily limited by the radar beam shape or the number of range pixels used by the radar. For the present invention, the ground strip is divided into portions which are sequentially mapped using SAR and the resultant maps are assembled together (i.e. mosaicked) to produce one contiguous SAR map of the ground strip.

An exemplary ground strip is generally rectangular shaped having a size that is defined by a range swath in the range direction (i.e. the direction normal to the direction of platform movement) and an overall length in the azimuthal direction (i.e. the direction that is parallel with the direction of platform movement). As such, the ground strip is bounded by a near-range edge and a far-range edge, with both edges extending substantially parallel to the direction of platform movement. During SAR mapping, a radar beam that subtends a substantially constant azimuthal beam angle is used, and accordingly, the beam has a substantially constant azimuthal beamwidth, W, at the near-range edge.

As indicated above, the ground strip is divided into portions that are sequentially mapped. In greater detail, the ground strip is divided into rectangular portions that make up a tile-like pattern. The tile-like pattern can be characterized as having a plurality of columns, with each column extending from the near-range edge to the far-range edge and containing two or more portions. Each column has a column length in the azimuthal direction that is equal to the near-range beamwidth, W. Accordingly, each column (and thus each portion) has a substantially equal length. The width of each portion measured in the range direction, however, is not equal for all portions. Instead, as detailed further below, the width of each portion increases with increasing distance (i.e. range) from the platform.

The ground strip is mapped by sequentially mapping each column, and each column is mapped by sequentially mapping each portion within the respective column. As the platform moves, each column along the ground strip is sequentially illuminated by the radar. More specifically, each column is illuminated while the platform moves through a distance $L_{illum}$ that is equal to the distance W (i.e. the near range beamwidth). During illumination of a column, the portions within the column are sequentially SAR mapped by altering the depression angle, $\phi$, of the radar beam.

For an exemplary column having N portions ($p_1$, $p_2 \ldots p_N$), each portion in the illuminated column is SAR mapped using a respective SAR aperture length ($l_1$, $l_2$, $\ldots$ $l_N$). For example, the aperture length $l_1$ corresponds to the distance the platform moves while the portion $p_1$ is mapped. It follows that the sum of aperture lengths for the column must be less than or equal to the distance the platform moves during illumination of the column ($l_1+l_2+ \ldots +l_N \leq L_{illum}$). In one implementation, the aperture length is increased as the depression angle decreases to allow all portions to be mapped with the same resolution ($l_1<l_2< \ldots <l_N$) where $l_1$ is the aperture length for a portion lying along the near-range edge.

During the sequential mapping, portion maps are stored in memory until all portions have been mapped. Once all portions in the ground strip have been SAR mapped, the stored maps are mosaicked, for example using image processing software, to produce a single SAR map of the ground strip.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
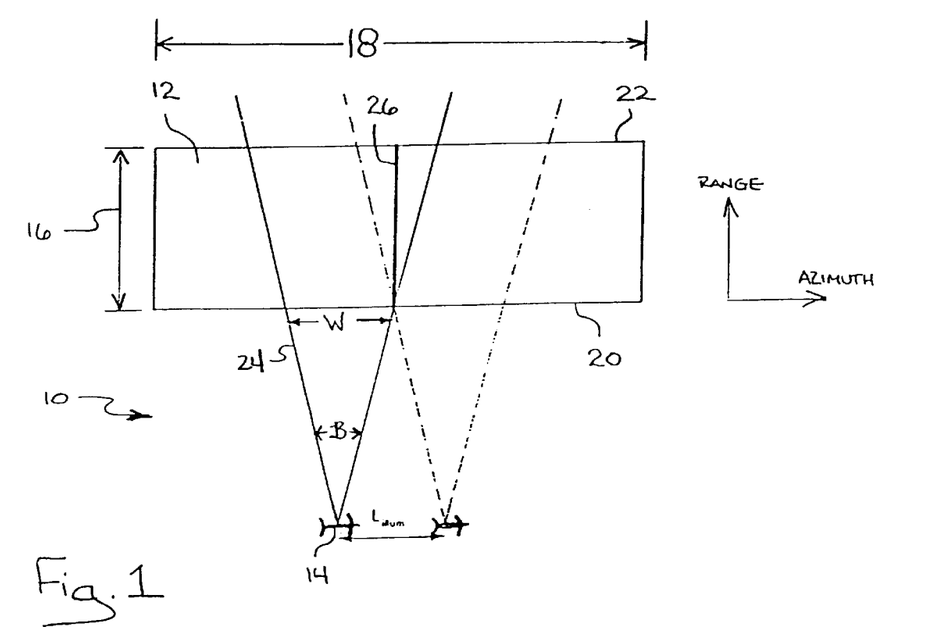
FIG. 1 is a top plan view of a ground strip partially illuminated by a radar beam projecting from a platform that is shown before and after movement from a first location (beam shown as solid line) to a second location (beam shown as dotted line)

Referring to FIG. 1, a system 10 for producing a synthetic aperture radar (SAR) mapping of a ground strip 12 is shown. As shown in FIG. 1, the system 10 includes a moving platform 14 that is equipped with synthetic aperture radar. A suitable SAR for the system 10 is the Lynx radar that has been designed and built by Sandia National Laboratories in collaboration with General Atomics. Although FIG. 1 illustrates the moving platform 14 as an airplane, it is to be appreciated that the moving platform is not limited to manned aircraft, but instead can include unmanned air vehicles (UAV) or any other moving platform capable of controlling the movement of at least a portion of an SAR to include the antenna of the SAR.

With continued reference to FIG. 1, an exemplary, rectangular shaped, ground strip 12 is shown having a size that is defined by a range swath 16 in the range direction (i.e. the direction normal to the direction of movement of the platform 14) and an overall length 18 in the azimuthal direction (i.e. the direction that is parallel with the direction of movement of the platform 14). As further shown, the ground strip 12 is bounded by a near-range edge 20 and a far-range edge 22, with both edges 20, 22 extending substantially parallel to the direction of movement of the platform 14.

Also shown in FIG. 1, a radar beam 24 projects from the platform 14 that subtends a substantially constant azimuthal beamwidth angle, $\beta$.

The beamwidth angle is given approximately by:

$$\beta = \frac{\lambda}{l_{az}}$$

where $l_{az}$ is the azimuthal dimension of the antenna.

At the near-range edge 20, the beam 24 maintains a substantially constant azimuthal beamwidth, W, as the platform 14 moves parallel to the near-range edge 20. It can further be seen from FIG. 1 that the beam 24 maintains the range line 26 illuminated while the platform 14 moves through a distance $L_{illum}$, and $$L_{illum} = 2R_{min}\sin\left(\frac{\beta}{2}\right) = W$$

where $R_{min}$ is the distance between the platform 14 and the near-range edge 20.

Figure 2:
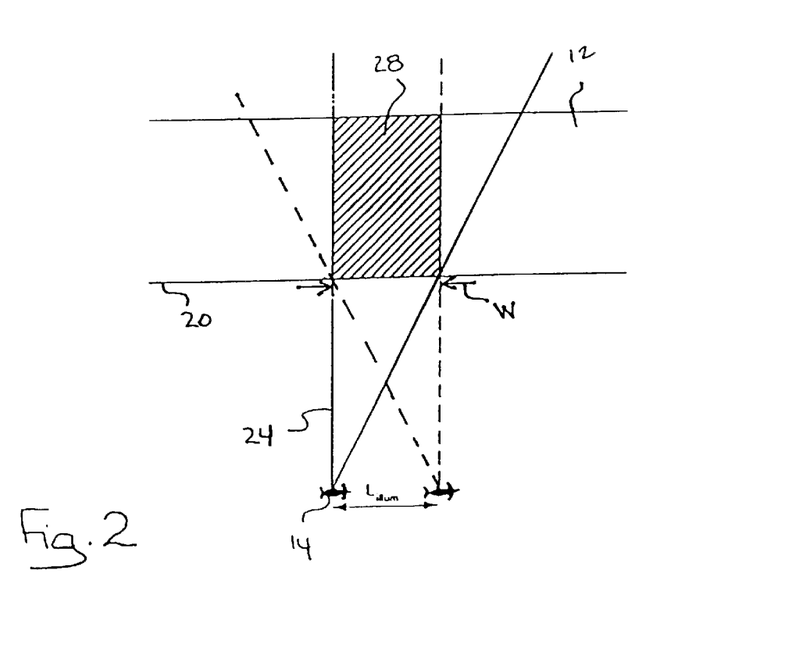
FIG. 2 is a top plan view of a ground strip showing a finite sized patch being continuously illuminated while a radar platform moves from a first location (solid line) to a second location (dotted line) and the radar beam is continuously reoriented relative to the platform as the platform moves.

FIG. 2 shows that a finite sized patch 28 can be continuously illuminated while a radar platform 14 moves through a distance, $L_{illum}$, by azimuthally sweeping the beam 24 relative to the platform 14 as the platform 14 moves. Comparison of FIGS. 1 and 2 shows that without sweeping (i.e. FIG. 1) only a range line 26 is continuously illuminated during movement of radar platform 14 through a distance, $L_{illum}$, while sweeping (i.e. FIG. 2) allows a finite sized patch 28 to be continuously illuminated. In both cases, the range line 26 or finite sized patch 28 is illuminated while the platform 14 moves through a distance, $L_{illum}$, that is equal to the azimuthal beamwidth W, at the near-range edge 20.

FIGS. 3A–F show that the ground strip 12 can be divided into portions 30a–c, 32a–c, 34a–c that are sequentially mapped by the system 10. In greater detail, the ground strip 12 is divided into rectangular portions 30a–c, 32a–c, 34a–c that make up a tile-like pattern. The tile-like pattern can be characterized as having columns 36, 38, 40, with each column 36, 38, 40 extending from the near-range edge 20 to the far-range edge 22. Although an exemplary ground strip 12 divided into three columns 36, 38, 40 is shown, it is to be appreciated that the ground strip 12 can be divided into any number of columns 36, 38, 40. Each column 36, 38, 40 has a column length in the azimuthal direction that is equal to the beamwidth, W, at the near-range edge 20. Accordingly, each column 36, 38, 40 (and thus each portion 30a–c, 32a–c, 34a–c) has a substantially equal length.

Figure 3A:
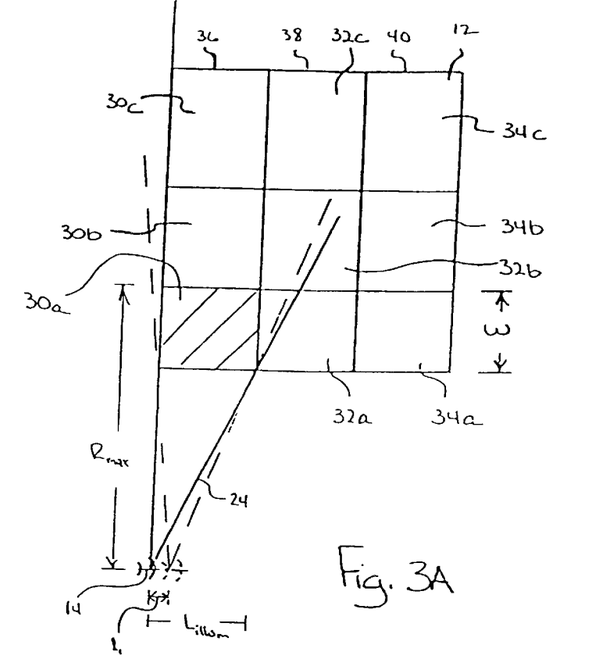
FIGS. 3A–3F are top plan views of a ground strip showing a sequential portion-by-portion mapping of the ground strip 12.

As shown in FIG. 3A, the exemplary ground strip 12 is divided into nine portions 30a–c, 32a–c, 34a–c. Specifically, as shown, column 36 includes three portions 30a–c, column 38 includes three portions 32a–c and column 40 includes three portions 34a–c. It can be seen from FIG. 3A that the width, w, of each portion 30a–c, 32a–c, 34a–c, measured in the range direction, is not necessarily equal for all portions 30a–c, 32a–c, 34a–c. Instead, as shown, the width, w, of each portion 30a–c, 32a–c, 34a–c increases with increasing distance (i.e. range) from the platform 14 because the depression angle, $\phi$, (shown in FIG. 4) has decreased. As detailed further below, the width, w, and number of portions 30a–c, 32a–c, 34a–c in each column 36, 38, 40 will depend on a number of factors including the elevation of the platform 14 above the ground, the desired resolution and the depression angle, $\phi$, at the far-range edge 22.

FIGS. 3A–F illustrate the sequential portion-by-portion mapping that begins with a mapping of portion 30a, as seen in FIG. 3A. With combined reference to FIGS. 3A–F it can be seen that the ground strip 12 can be mapped by sequentially mapping each column 36, 38, 40, and each column 36, 38, 40 can be mapped by sequentially mapping each portion 30a–c, 32a–c, 34a–c within the respective column 36, 38, 40.

Figure 3B:
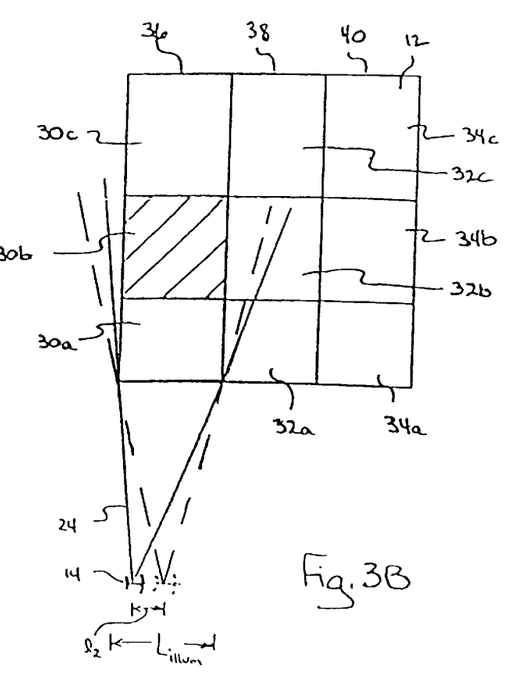
Figure 3C:
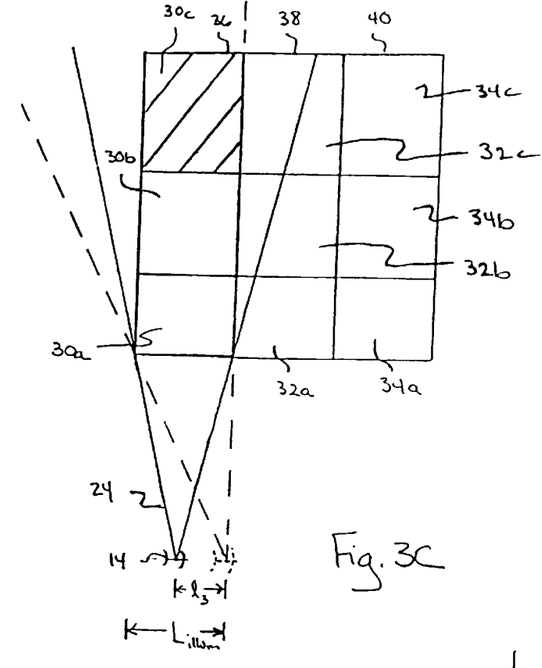

As the platform 14 moves, each column 36, 38, 40 along the ground strip 12 is sequentially illuminated by the radar beam 24. With reference to FIGS. 3A–C, it can be seen that column 36 remains illuminated while the platform 14 moves through a distance $L_{illum}$ that is equal to the distance, W, (i.e. the near range beamwidth). It can be further seen that the beam 24 is azimuthally swept relative to the platform 14 (see discussion above regarding FIG. 2). The sweep rate shown is continuous and uniform from a first orientation (solid line in FIG. 3A) to a second orientation (dotted line in FIG. 3C) as the platform 14 moves through the distance $L_{illum}$. The azimuthal sweeping of the beam 24 allows the entire column 26 to remain illuminated as the platform 14 moves through the distance Lilium. Cross-referencing FIGS. 3C and 3D, it can be seen that once platform 14 reaches the end of column 36, the beam 24 is rapidly reoriented from the second orientation to the first orientation to allow column 38 to be illuminated as platform 14 movement continues.

Continuing with reference to FIGS. 3A–3C, it can be seen that portions 30a, 30b and 30c are mapped sequentially while column 36 is illuminated. More specifically, portion 30a is mapped with an SAR aperture length, $l_1$, corresponding to the distance the platform 14 has moved in FIG. 3A (i.e. from the first position where represented by solid lines to the second position represented by dashed lines).

Figure 4:
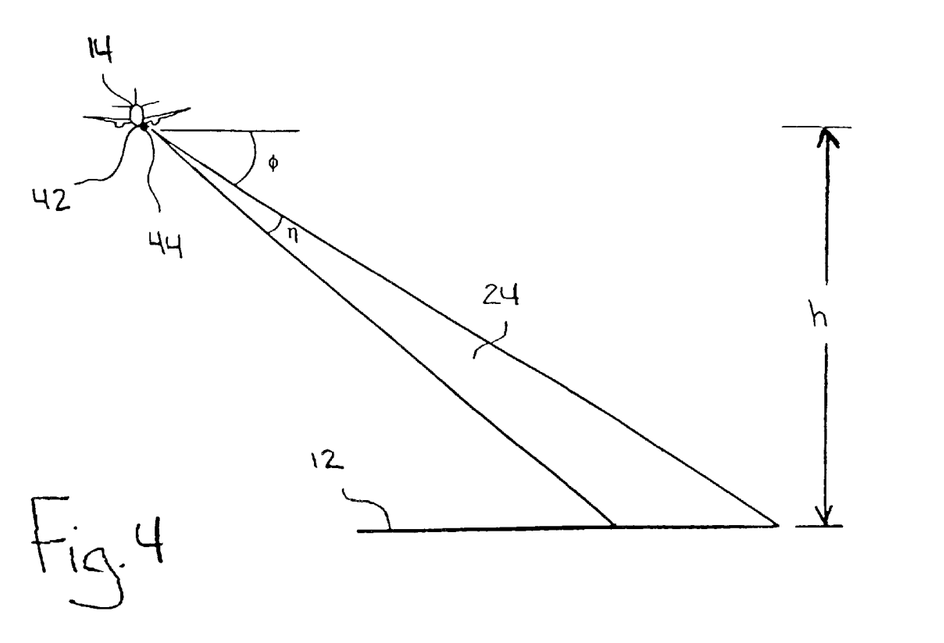
FIG. 4 is an elevation view of a radar equipped platform mapping a ground strip.
Figure 5:
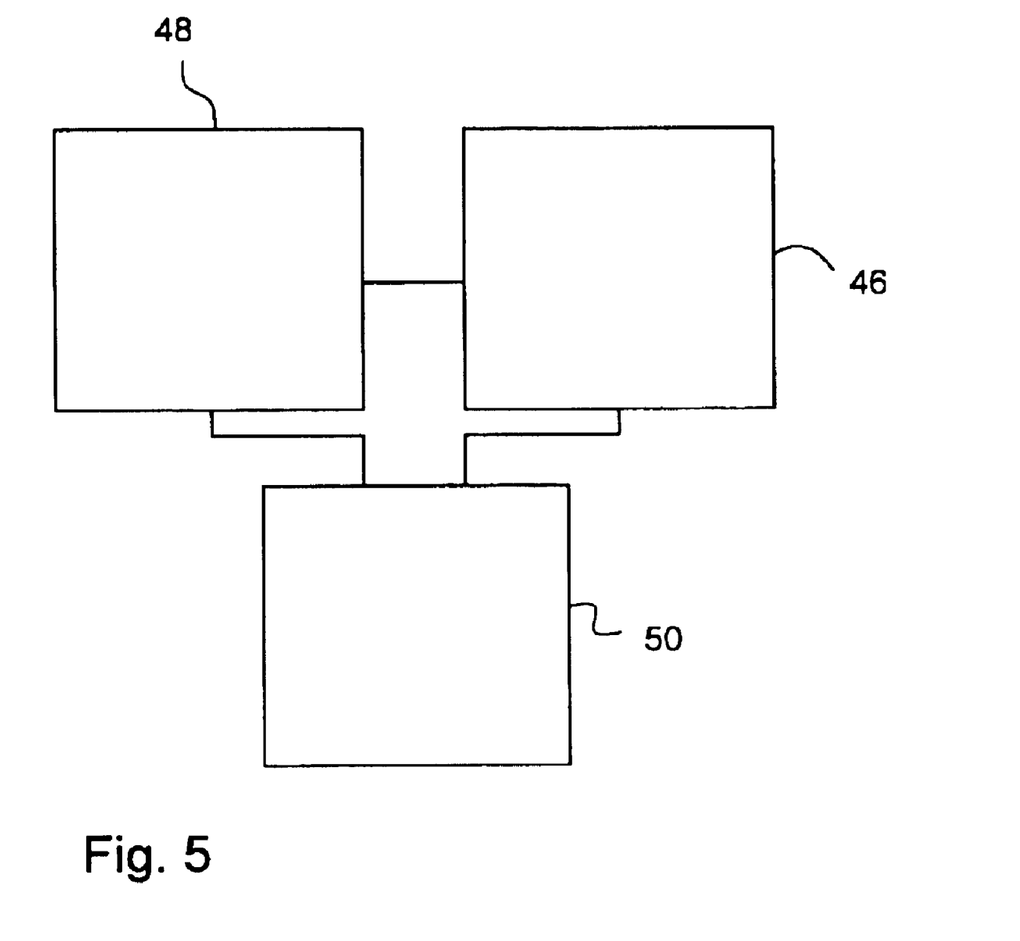

With cross-reference to FIGS. 3A, 3B and 4, it can be seen that once the platform 14 has moved through the distance, $l_1$, the depression angle, $\phi$, of the radar beam 24 is reduced to map portion 30b. In greater detail, a directing mechanism 42, such as a mechanical gimbal or an actively scanned phased array, can be used to rotate radar antenna 44 to thereby alter the depression angle, $\phi$, of the radar beam 24. At the new depression angle, $\phi$, the next portion, in this case portion 30b, is mapped with an SAR aperture length, $l_2$, corresponding to the distance the platform 14 has moved in FIG. 3B (i.e. from the position where represented by solid lines to the position represented by dashed lines). Referring now with reference to FIGS. 3B and 3C, once the platform 14 has moved through the distance, $l_2$, the depression angle, $\phi$, of the radar beam 24 is reduced to map portion 30c. At the reduced depression angle, $\phi$, portion 30c is mapped with an SAR aperture length, $l_3$, corresponding to the distance the platform 14 has moved in FIG. 3C (i.e. from the position where represented by solid lines to the position represented by dashed lines). The sum of aperture lengths, I, for the column 36 are equal or slightly less than the distance the platform 14 moves during illumination of the column 36 (i.e. $l_1+l_2+l_3 \leq L_{illum}$), with some platform 14 movement allotted to altering the depression angle, $\phi$, and reorienting the beam 24 back to the first sweep orientation. From FIGS. 3A–3C, it can be seen that the aperture length, I, is increased as the depression angle, $\phi$, decreases to allow the portions 30a–c to be mapped with the same resolution ($l_1<l_2<l_3$). Specifically, for a given resolution, $\rho$, the length of the synthetic aperture is given by:

$$l = \frac{a_w \lambda R_{max}}{2\rho}$$

where $R_{max}$ is the far range of the portion 30a–c and $a_w$ is the azimuthal windowing factor, which for Lynx, $a_w \approx 1.2$.

Since $R_{max}$ increases with decreasing depression angle, $\phi$, it follows that the aperture length, l, must increase with decreasing depression angle, $\phi$, to maintain resolution $\rho$.

At fine resolution, $\rho$ can be so small that $l \sim L_{illum}$. In this case, an extended swath SAR stripmap cannot be made. At coarser resolutions, $l < L_{illum}$. In these cases, one may take advantage of the smaller values of "l" to produce multiple tiles to extend the range swath.

Figure 3D:
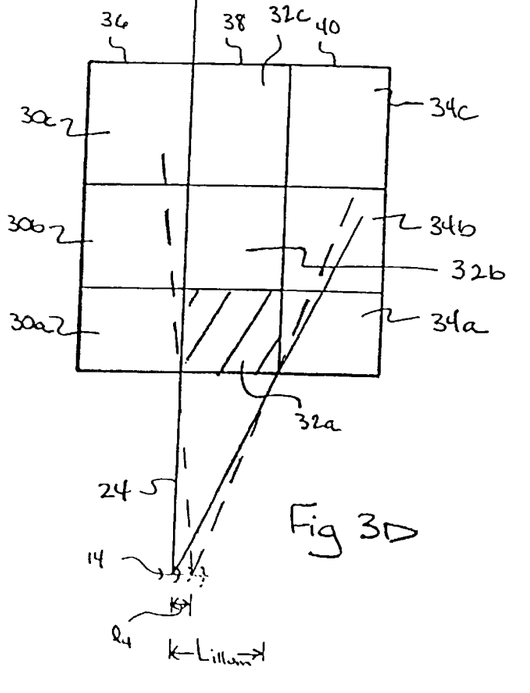
Figure 3E:
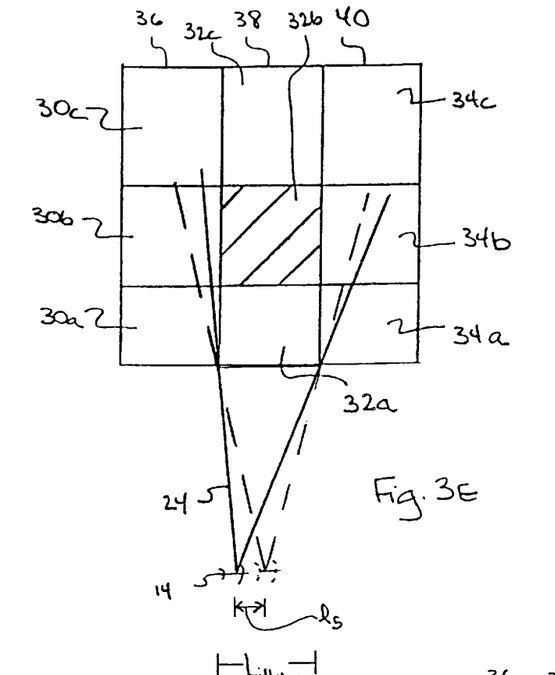
Figure 3F:
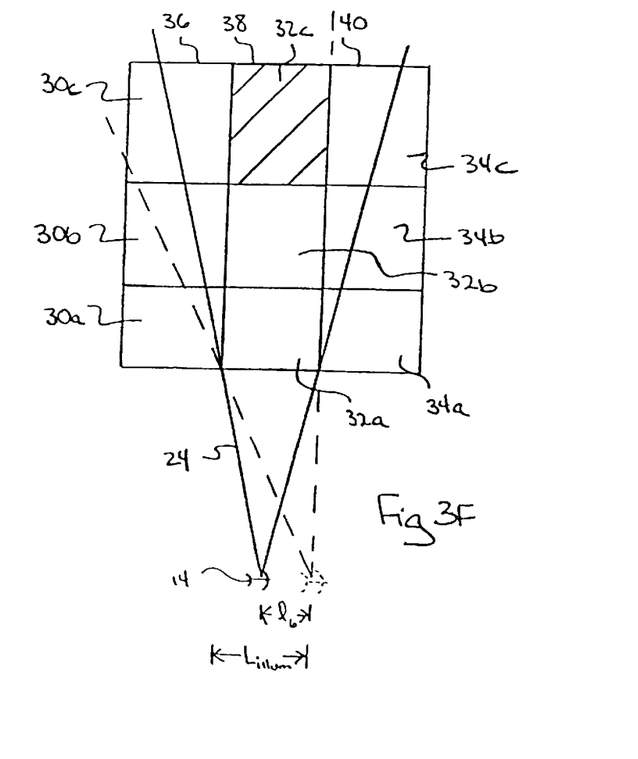

Once the portions 30a–c in column 36 have been mapped, the beam 24 is rapidly reoriented to the beam orientation indicated by the solid lines in FIG. 3D to prepare for the sequential mapping of portions 32a–c in column 38. With reference to FIGS. 3D–3F, it can be seen that column 38 is mapped in a manner similar to column 36 as described above. More specifically, portion 32a is mapped with an SAR aperture length, $l_4$, corresponding to the distance the platform 14 has moved in FIG. 3D (i.e. from the first position where represented by solid lines to the second position represented by dashed lines). Once the platform 14 has moved through the distance, $l_4$, the depression angle, $\phi$, of the radar beam 24 is reduced to map portion 32b. At the reduced depression angle, $\phi$, portion 32b is mapped with an SAR aperture length, $l_5$, corresponding to the distance the platform 14 has moved in FIG. 3E (i.e. from the position where represented by solid lines to the position represented by dashed lines).

Once the platform 14 has moved through the distance, $l_5$, the depression angle, $\phi$, of the radar beam 24 is once again reduced to map portion 32c. At the reduced depression angle, $\phi$, portion 32c is mapped with an SAR aperture length, $l_6$, corresponding to the distance the platform 14 has moved in FIG. 3F (i.e. from the position where represented by solid lines to the position represented by dashed lines). The sum of aperture lengths, I, for the column 38 are equal to or slightly less than the distance the platform 14 moves during illumination of the column 38 (i.e. $l_4+l_5+l_6 \leq L_{illum}$). Once column 38 has been mapped, remaining columns, such as column 40, can be mapped in a similar manner. During the sequential mapping, portion maps are stored in computer memory until all portions 30a–c, 32a–c, 34a–c have been mapped. Once all portions 30a–c, 32a–c, 34a–c in the ground strip 12 have been SAR mapped, the stored maps are mosaicked, for example using image processing software, to produce a single SAR map of the ground strip 12.

The system 10 is capable of mapping a coverage area that is not necessarily limited by the radar beam shape or the number of range pixels used by the radar. The width ($R_{max}-R_{min}$) of each portion 30a–c, 32a–c, 34a–c in the ground strip 12 is generally limited at large depression angles, $\phi$, by the radar beam shape:

$$\frac{\Delta R_a}{h} = \frac{1}{\sin\phi} - \frac{1}{\sin(\phi + \eta_{antenna})}$$

On the other hand, at small depression angles, $\phi$, the width ($R_{max}-R_{min}$) of each portion 30a–c, 32a–c, 34a–c in the ground strip 12 is generally limited by the number of range pixels used by the radar:

$$\Delta R_p = \frac{N_{pixels}\rho}{\xi}$$

where $\rho$ is the resolution, $N_{pixels}$ is the number of pixels and $\xi$ is the number of pixels per resolution cell.

The number of range swaths that can be stacked on one another depends on how much time is available, which depends on $L_{illum}$:

$$T_{avail} = \frac{1}{f_m} \frac{2R_{min}}{v} \sin\left(\frac{\beta}{2}\right)$$

where $v$ is the aircraft velocity. $R_{min}$ is the minimum range of the extended swath.

$$f_m \approx \frac{L_{illum}}{L_{ap}}$$

The time required to mosaic N extended swaths is given by:

$$T_{req}=T_{ap}(1)+T_{gimbal}+T_{other}+T_{ap}(2)+T_{gimbal}+T_{other}+\ldots+T_{ap}(N)+T_{gimbal}+T_{other}$$

where the aperture time of the Nth step is just:

$$T_{ap}(N) = \frac{a_w \lambda R_{max}(N)}{2\rho v}$$

and $R_{max}(N)$ is the far range of the Nth tiled image.

To maximize the total extended swath, the sum at the shallowest depression angle desired is calculated since at small depression angles, the range swath is maximum. Requiring that $T_{req} \leq T_{avail}$ determines N.

While the particular System And Method For Synthetic Aperture Radar Mapping A Ground Strip Having Extended Range Swath as herein shown and disclosed in detail are fully capable of obtaining the objects and providing the advantages herein before stated, it is to be understood that they are merely illustrative of the presently preferred embodiments of the invention and that no limitations are intended to the details of construction or design herein shown other than as described in the appended claims.

What is claimed is:

1. A method for radar mapping a ground strip from a moving platform, said ground strip having first and second portions, said method comprising the steps of:
   using synthetic aperture radar (SAR) at a first depression angle, $\phi_1$, to create a radar map of said first portion of said ground strip wherein said first and second portions are illuminated by said SAR during creation of said first portion radar map;
   using SAR at a second depression angle, $\phi_2$, different from said first depression angle $\phi_1$, ($\phi_1 \neq \phi_2$) to create a radar map of said second portion of said ground strip; and
   mosaicking said radar maps of said first and second portions of said ground strip together to prepare a radar map of said ground strip.

2. A method as recited in claim 1 further comprising the steps of:
   using SAR at said first depression angle, $\phi_1$, to create a radar map of a third portion of said ground strip;
   using SAR at said second depression angle, $\phi_2$, to create a radar map of a fourth portion of said ground strip; and
   mosaicking said radar maps of said first, second, third and fourth portions of said ground strip together to prepare a radar map of said ground strip.

3. A method as recited in claim 2 further comprising the steps of:
   using SAR at a third depression angle, $\phi_3$, to create radar maps of a fifth and sixth portion of said ground strip; and
   mosaicking said radar maps of said first, second, third, fourth, fifth and sixth portions of said ground strip together to prepare a radar map of said ground strip.

4. A method as recited in claim 1 wherein said radar map of a first portion and said radar map of said second portion have substantially the same resolution.

5. A method as recited in claim 1 wherein said ground strip has a near-range edge, said SAR has an azimuthal radar beamwidth, W, at said near-range edge and the length of each said portion measured parallel to said near-range edge is substantially equal to said azimuthal radar beamwidth, W.

6. A method as recited in claim 1 wherein said moving platform is an aircraft.

7. A method as recited in claim 1 wherein said step of using synthetic aperture radar (SAR) at a first depression angle, $\phi_1$, to create a radar map of a first portion of said ground strip is performed before said step of using SAR at a second depression angle, $\phi_2$, to create a radar map of a second portion of said ground strip, and wherein said first depression angle is larger than said second depression angle ($\phi_1 > \phi_2$).

8. A method for radar mapping a ground strip from a moving platform, said ground strip defined by a near-range edge and a far-range edge relative to said platform, said method comprising the steps of:
   using synthetic aperture radar (SAR) for an aperture length, $l_1$, at a first depression angle, $\phi_1$, to create a radar map of a first portion of said ground strip, said SAR having an azimuthal radar beamwidth, W, at said near-range edge;
   using SAR for an aperture length, $l_2$, at a second depression angle, $\phi_2$, to create a radar map of a second portion-of said ground strip, wherein the sum of said aperture lengths ($l_1+l_2$) is not longer than said azimuthal beamwidth, W;
   using SAR for an aperture length, $l_3$, at said first depression angle, $\phi_1$, to create a radar map of a third portion of said ground strip,
   using SAR for an aperture length, $l_4$, at said second depression angle, $\phi_2$, to create a radar map of a fourth portion of said ground strip, wherein the sum of said aperture lengths ($l_3+l_4$) is not longer, than said azimuthal beamwidth, W: and
   mosaicking said radar maps of said first, second, third and fourth portions of said ground strip together to prepare a radar map of said ground strip.

9. A method as recited in claim 8 wherein said first and second portions are illuminated by said SAR during a movement of said platform through a distance, $d_{illum}$, with said distance, $d_{illum}$, being substantially equal to said azimuthal beamwidth, W.

10. A method as recited in claim 8 wherein said first aperture length, $l_1$, is less than said second aperture time, $l_2$, ($l_1 < l_2$).

11. A method as recited in claim 8 wherein said radar map of a first portion and said radar map of said second portion have substantially the same resolution.

12. A method as recited in claim 8 further comprising the steps of:
   using SAR at a third depression angle, $\phi_3$, to create radar maps of a fifth and sixth portion of said ground strip; and
   mosaicking said radar maps of said first, second, third, fourth, fifth and sixth portions of said ground strip together to prepare a radar map of said ground strip.

13. A method as recited in claim 8 wherein said first aperture length, $l_1$, is less than said second aperture time, $l_2$, ($l_1 < l_2$) and said first depression angle is larger than said second depression angle ($\phi_1 > \phi_2$).

14. A method as recited in claim 8 wherein said moving platform is an aircraft.

15. A method as recited in claim 8 wherein said step of using synthetic aperture radar (SAR) for an aperture length, $l_1$, at a first depression angle, $\phi_1$, is performed before said step of using SAR for an aperture length, $l_2$, at a second depression angle, $\phi_2$, and wherein said first depression angle is larger than said second depression angle ($\phi_1 > \phi_2$).

16. A system for radar mapping a ground strip from a moving platform, said system comprising:

a radar means for creating synthetic aperture radar (SAR) maps of a first plurality of portions of said ground strip at a first depression angle, $\phi_1$;

a means for redirecting said radar means to a second depression angle, $\phi_2$, different from said first depression angle, $\phi_1$, ($\phi_1 \neq \phi_2$) to create synthetic aperture radar (SAR) maps of a second plurality of portions of said ground strip at said second depression angle; and means for mosaicking said radar maps of said first and second plurality of portions to prepare a map of said ground strip.

17. A system as recited in claim 16 wherein said radar means has a substantially constant azimuthal beam width angle.

18. A system as recited in claim 16 wherein said platform is an aircraft.

19. A system as recited in claim 16 wherein said ground strip is bounded by a near-range edge and a far-range edge with each said edge extending substantially parallel to the direction of platform movement, wherein the distance between said near-range edge and said far-range edge is the range swath of said ground strip, wherein said radar means has a substantially constant elevational beam width at said near-range edge, and wherein said range swath of said ground strip is longer than said elevational beam width.

20. A system as recited in claim 16 wherein said redirecting means comprises an actively scanned phased array.

21. A system as recited in claim 16 wherein said redirecting means comprises a mechanical gimbal.

* * * * *

UNITED STATES PATENT AND TRADEMARK OFFICE
CERTIFICATE OF CORRECTION

PATENT NO. : 6,738,009 B1
DATED : May 18, 2004
INVENTOR(S) : Stanley I. Tsunoda

It is certified that error appears in the above-identified patent and that said Letters Patent is hereby corrected as shown below:

Column 5,
Line 20, delete "Lilium" insert -- $L_{illum}$ --
Lines 51 and 57, delete "I," insert -- l, --

Column 6,
Line 4, delete "I~" insert -- l~ --
Line 6, delete "I<" insert -- l< --
Lines 7 and 34, delete "I" insert -- l --

Column 8,
Line 33, delete "portion-of" insert -- portion of --
Line 42, delete "longer," insert -- longer --

Signed and Sealed this

Sixth Day of July, 2004

JON W. DUDAS
*Acting Director of the United States Patent and Trademark Office*